US011384245B2

(12) United States Patent
Lucic et al.

(10) Patent No.: US 11,384,245 B2
(45) Date of Patent: Jul. 12, 2022

(54) PURIFIED CONCENTRATED AQUEOUS LEUCOINDIGO SALT SOLUTIONS

(71) Applicant: Archroma IP GmbH, Reinach (CH)

(72) Inventors: Erwin Lucic, Singapore (SG); Jorg Hubner, Heidelberg (DE)

(73) Assignee: Archroma IP GmbH, Reinach (CH)

(*) Notice: Subject to any disclaimer, the term of this patent is extended or adjusted under 35 U.S.C. 154(b) by 329 days.

(21) Appl. No.: 16/637,862

(22) PCT Filed: Aug. 10, 2018

(86) PCT No.: PCT/EP2018/071783
§ 371 (c)(1),
(2) Date: Feb. 10, 2020

(87) PCT Pub. No.: WO2019/030389
PCT Pub. Date: Feb. 14, 2019

(65) Prior Publication Data
US 2020/0247999 A1  Aug. 6, 2020

(30) Foreign Application Priority Data

Aug. 11, 2017 (EP) .................... 17185971
Aug. 11, 2017 (EP) .................... 17185976
Aug. 11, 2017 (EP) .................... 17185980
May 18, 2018 (EP) .................... 18173343

(51) Int. Cl.
| C09B 7/00 | (2006.01) |
| C09B 7/02 | (2006.01) |
| C09B 67/54 | (2006.01) |
| D06P 1/22 | (2006.01) |
| C09B 67/44 | (2006.01) |
| B01D 3/14 | (2006.01) |

(52) U.S. Cl.
CPC ............ C09B 7/02 (2013.01); C09B 67/0083 (2013.01); C09B 67/0096 (2013.01); D06P 1/228 (2013.01); B01D 3/14 (2013.01)

(58) Field of Classification Search
CPC ... C09B 7/02; C09B 67/0096; C09B 67/0083; C09B 67/0077; C09B 7/00; C09B 9/04; C09B 7/08; D06P 1/228; B01D 3/14
USPC ........................................ 548/457
See application file for complete search history.

(56) References Cited

U.S. PATENT DOCUMENTS

| 2,130,878 A | 9/1938 | Davidson et al. | |
| 5,116,996 A * | 5/1992 | Kohlhaupt | C09B 7/02 548/457 |
| 5,424,453 A | 6/1995 | Kohlhaupt et al. | |
| 5,536,842 A * | 7/1996 | Bergmann | C09B 7/02 548/457 |
| 5,586,992 A | 12/1996 | Schnitzer et al. | |
| 5,888,254 A * | 3/1999 | Gang | C08F 20/36 8/918 |
| 6,169,218 B1 | 1/2001 | Hearn et al. | |
| 6,428,581 B1 * | 8/2002 | Gang | D06P 1/228 8/527 |

FOREIGN PATENT DOCUMENTS

| CN | 1107489 A | 8/1995 |
| EP | 2083147 A1 | 7/2009 |
| GB | 2283022 A | 4/1995 |
| JP | H03016602 A | 1/1991 |
| JP | H07157684 A | 6/1995 |
| JP | H10111633 A | 4/1998 |
| JP | 2002520469 A | 7/2002 |
| JP | 2020530517 A | 10/2020 |
| JP | 2020530518 A | 10/2020 |
| TW | 444049 B | 7/2001 |
| TW | I251613 B | 3/2006 |
| WO | 2004024826 A2 | 3/2004 |

OTHER PUBLICATIONS

Japanese Patent Office, Office Action issued in JP 2020-507660 dated Dec. 7, 2021.
Japanese Patent Office, Office Action issued in JP 2020-507643 dated Oct. 26, 2021.
Taiwan Patent Office, Office Action issued in TW 107127917 dated Nov. 15, 2021.
Singapore Patent Office, Second Written Opinion issued in SG 11202001152Y dated Jan. 17, 2022.
Argentina Patent Office, Office Action issued in AR 20180102290 dated Dec. 21, 2021.
Chinese Patent Office, Office Action issued in CN 201880059267.4 dated Dec. 2, 2021.
PCT Office, International Search Report issued in PCT/EP2018/071791 dated Oct. 22, 2018, 3 pages.
PCT Office, International Search Report issued in PCT/EP2018/071800 dated Oct. 22, 2018, 3 pages.
PCT Office, International Search Report issued in PCT/EP2018/071805 dated Nov. 12, 2018. 3 pages.
Singapore Patent Office, Second Written Opinion issued in SG 11202001151P dated Jan. 17, 2022.
PCT Office, International Search Report issued in PCT/EP2018/071783 dated Oct. 22, 2018, 3 pages.
European Patent Office, Extended Search Report issued in EP 17185971 dated Feb. 7, 2018.
European Patent Office, Extended Search Report issued in EP 17185976 dated Feb. 2, 2018.
European Patent Office, Extended Search Report issued in EP 17185980 dated Feb. 2, 2018.

(Continued)

*Primary Examiner* — Eisa B Elhilo
(74) *Attorney, Agent, or Firm* — Wood Herron & Evans LLP

(57) ABSTRACT

Aqueous leucoindigo solution comprising an aromatic amine, in particular aniline or aniline and N-methylaniline, wherein the concentration of the aromatic amine is below 200 ppm, wherein the leucoindigo salt in the solution is in the form of a mixed sodium and potassium salt, wherein the molar ratio of sodium to potassium is in the range of from above 3:1 to 10:1, preferably wherein the concentration of the salt is in the range of from above 25 to 45% by weight, based on the total weight of the solution.

24 Claims, No Drawings

(56) References Cited

OTHER PUBLICATIONS

European Patent Office, Extended Search Report issued in EP 18173343 dated Nov. 12, 2018.
U.S. Patent and Trademark Office, Non-final Office Action issued in U.S. Appl. No. 16/637,874 dated Feb. 5, 2021.
U.S. Patent and Trademark Office, Non-final Office Action issued in U.S. Appl. No. 16/637,886 dated May 13, 2021.
R. M. Price, Distillation. http://facstaff.cbu.edu/rprice/lectures/distill.html, Feb. 13, 2003.
Chinese Patent Office, Office Action issued in 201880059273.X dated Feb. 14, 2022.
Japanese Patent Office, Notice of Reasons for Rejection issued in JP 2020-507661 dated Apr. 5, 2022.
Brazilian Patent Office, Office Action issued in BR112019018490-2 dated May 16, 2022.
Brazilian Patent Office, Office Action issued in BR112019018494-5 dated May 16, 2022.
Brazilian Patent Office, Office Action issued in BR112019018498-8 dated May 16, 2022.
Brazilian Patent Office, Office Action issued in BR112019018497-0 dated May 16, 2022.

\* cited by examiner

PURIFIED CONCENTRATED AQUEOUS LEUCOINDIGO SALT SOLUTIONS

CROSS-REFERENCE TO RELATED APPLICATIONS

The present invention is related to U.S. Serial No. 16/637,874, filed Feb. 10, 2020, U.S. Ser. No. 16/637,886, filed Feb. 10, 2020, and U.S. Ser. No. 16/637,889, filed Feb. 10, 2020.

FIELD OF THE INVENTION

The invention is in the field of stable and purified concentrated aqueous leucoindigo salt solutions and indigo obtained therefrom.

BACKGROUND OF THE INVENTION

Indigo is a vat dye used for dyeing cellulose-containing textile materials.

For application on a textile material, indigo is subjected to reduction wherein a water-soluble leucoindigo salt is formed. This salt is then applied in aqueous solution to the textile material. Oxidation of the leucoindigo salt results in the formation of indigo, wherein the dyed textile material is obtained.

Synthetically produced indigo contains impurities entrapped therein based on aromatic amines due to the commonly used production processes, in particular aniline and/or N-methylaniline. For example, synthetically produced indigo may contain up to 6,000 ppm aniline and up to 4,000 ppm N-methylaniline. Aromatic amines such as aniline and N-methylaniline are not desired in textile applications. Thus, these impurities should be removed as far as possible from indigo, respectively the leucoindigo salt made therefrom, prior to the application on the textile material.

WO 2004/024826 suggests removing aromatic amine impurities on the stage of the aqueous leucoindigo salt solution by distillation, steam distillation, extraction or by stripping with an inert gas. This prior art discloses that the concentration of aromatic amines may be reduced below an amount of 200 ppm. The purified leucoindigo salt solution may then be subjected to oxidation in order to obtain indigo containing said low amounts of aromatic amines, if any, wherein the leucoindigo is present on a textile material prior to the oxidation.

Furthermore, for transportation and application, an aqueous leucoindigo salt solution should be as stable as possible in order to prevent undesired crystallization and/or precipitation of the salt. This is in particular important if the leucoindigo salt is present in the aqueous medium in a relative high concentration. Concentrated leucoindigo salt solutions are advantageous in the vat dying process due to a reduced wastewater contamination.

WO 00/04100 suggests providing an aqueous leucoindigo solution in the form of a mixed sodium and potassium salt, wherein the mole-% of sodium is in the range of from 70 to 30, and the mole-% of potassium is correspondingly in the range of from 30 to 70. This corresponds to a molar ratio of sodium to potassium in the range of from 2.33:1 to 1:2.33. Within said range, despite a relative high concentration of the leucoindigo salt of from 25 to 40% by weight, said dissolved leucoindigo salt solution is stable at room temperature, or is stable at an increased temperature in the range of from 40 to 60 ° C. in case of a concentration between 50 and 55% by weight, i.e. the salt is not prone to crystallization or precipitation. This prior art further discloses a molar ratio of sodium to potassium in the range of from 3:1 to 1:3, which corresponds to a mole-% range of sodium of from 75 to 25, and potassium of from 25 to 75.

WO 00/04100 further teaches with reference to WO 94/23114 that a solution of leucoindigo in the form of a sodium salt is stable up to a concentration of 20% by weight only. This means nothing else than that the replacement of potassium by sodium in the leucoindigo salts defined in WO 00/04100 negatively affects stability of a respective solution and promotes crystallization.

OBJECTS OF THE INVENTION

There is an ongoing need in the industry for providing further stable and purified concentrated leucoindigo salt solutions and indigo made therefrom.

SUMMARY OF THE INVENTION

Despite the teaching of the addressed prior art, i.e. that concentrated leucoindigo salt solutions may be provided in a molar range of sodium to potassium in the range of from 2.33:1 to 1:2.33, and that sodium negatively affects the stability of leucoindigo solutions, the inventors of the present invention have investigated leucoindigo salt solutions having an increased molar ratio of sodium to potassium. The inventors of the present invention have surprisingly discovered that further stable and concentrated leucoindigo salt solutions may be prepared which meet industrial requirements by increasing the molar ratio of sodium to potassium known from the prior art in the range of from 3:1 to 1:3 to a molar ratio above 3:1. Stable concentrated solutions may be prepared up to a molar ratio of sodium to potassium of 10:1, such as from 3.5:1 to 10:1. Solutions may be obtained having a leucoindigo salt concentration of from 25 to 45% by weight such as 30% by weight, based on the total weight of the solution, which are stable at room temperature or at elevated temperature up to 60 ° C. This resulting concentration range is sufficient to achieve the desired middle and deep shades in the vat dyeing process. Also the requirements of a reduced wastewater contamination in the dyeing factories may be met.

The crude leucoindigo salt solutions may be subjected to a purification step such as distillation in order to remove undesired excess aromatic amines, wherein purified and stable concentrated leucoindigo salt solutions may be obtained.

The invention relates to the following items:

1. Method of making an aqueous leucoindigo salt solution, the method comprising step (A):
   (A) subjecting an aqueous composition comprising indigo which contains an aromatic amine in the form of aniline or aniline and N-methylaniline, to reduction, preferably hydrogenation, in the presence of sodium hydroxide and potassium hydroxide in order to generate an aqueous leucoindigo solution comprising said aromatic amine, wherein said leucoindigo is in the form of a mixed sodium and potassium salt, wherein the molar ratio of sodium to potassium is in the range of from above 3:1 to 10:1, such as 3.5:1 to 10:1.
2. Method of purifying an aqueous leucoindigo solution comprising an aromatic amine in the form of aniline or aniline and N-methylaniline, wherein said leucoindigo is in the form of a mixed sodium and potassium salt, wherein the molar ratio of sodium to potassium is in the range of from above 3:1 to 10:1, such as 3.5:1 to 10:1, the method comprising step (B):
  (B) subjecting the aqueous leucoindigo solution comprising said aromatic amine to a purification step selected from the group consisting of
    (a) distillation;
    (b) steam distillation;
    (c) extraction;
    (d) stripping with an inert gas;
    (e) subjecting the leucoindigo solution to a purification stream;
    (f) or to a combination of two or more thereof.
3. Method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of a mixed sodium and potassium salt, wherein the molar ratio of sodium to potassium is in the range of from above 3:1 to 10:1, such as 3.5:1 to 10:1, the method comprising at least step (B):
  (B) subjecting the aqueous leucoindigo solution comprising said aromatic amine(s) to a purification step selected from the group consisting of
    (a) distillation;
    (b) steam distillation;
    (c) liquid-liquid-extraction;
    (d) stripping with an inert gas;
    (e) subjecting the leucoindigo solution to a purification stream;
    (f) or to a combination of two or more thereof.
4. Method of item 2 or 3, wherein
  (a) distillation is performed using a column provided with trays or packing materials;
  (c) extraction is a liquid-liquid-extraction using a centrifugal extractor;
  (e) subjecting the leucoindigo solution to a purification stream comprises at least steps (α) to (γ):
    (α) providing a liquid stream comprising said aqueous leucoindigo solution comprising said amine(s);
    (β) providing a purification stream;
    (γ) bringing into contact said liquid stream with said purification stream.
5. Method of item 4, wherein step (γ) comprises steps (γ1) and (γ2), and the method further comprises steps (δ) and (ε):
  (γ1) feeding said liquid stream and
  (γ2) feeding said purification stream
  into a device configured to bring into contact said liquid stream with said purification stream;
  (δ) discharging from the device at least a portion of said purification stream that has contacted said liquid stream; and
  (ε) discharging from the device at least a portion of said liquid stream that has been contacted by said purification stream.
6. Method of item 5, wherein the liquid stream and the purification stream are counter-current streams.
7. Method of any one of items 4 to 6, wherein the purification stream is a vapor stream.
8. Method of item 7, wherein said vapor stream comprises an inert gas, a gaseous organic solvent which is not miscible with water, or steam, or two or three thereof.
9. Method of any one of items 4 to 8, wherein the device is selected from the group consisting of plate column, packed column, or bubble column, or two or three thereof, or two or more of any of said columns.
10. Method of any one of items 4 to 9, wherein said steam is generated by heating at least a portion of said liquid stream that has been discharged from the device according to step (ε).
11. Method of any one of items 4 to 10, wherein steps (α) to (ε) are performed simultaneously.
12. Method of any one of items 2 to 11, comprising step (A) prior to step (B):
  (A) subjecting an aqueous composition comprising indigo which contains an aromatic amine in the form of aniline or aniline and N-methylaniline, to reduction, preferably hydrogenation, in the presence of sodium hydroxide and potassium hydroxide in order to generate an aqueous leucoindigo solution comprising said aromatic amine, wherein said leucoindigo is in the form of a mixed sodium and potassium salt, wherein the molar ratio of sodium hydroxide to potassium hydroxide is in the range of from above 3:1 to 10:1, such as 3.5:1 to 10:1.
13. Method of any one of the preceding items, wherein the molar ratio of sodium to potassium is in the range of from 4:1 to 8:1 or wherein the molar ratio of sodium to potassium is in the range of from 5:1 to 7:1.
14. Method of item 2 or 3 or any one of items 4 to 13 as far as depending on item 2 or 3, wherein the concentration of said aromatic amine in the solution prior to purification or prior to the making is above 200 ppm determined according to ISO 14362-1:2017(E), such as 2,000 to 10,000 ppm.
15. Method of item 2 or 3 or any one of items 4 to 14 as far as depending on item 2 or 3, wherein the distillation performed in step (B) is selected from the group consisting of: distillation at normal pressure, distillation under vacuum and steam distillation, or a combination of two or three thereof.
16. Method of item 2 or 3 or any one of items 4 to 15 as far as depending on item 2 or 3, wherein step (B) is performed as long as or as often as required until after purification or after the making the concentration of the aromatic amine in the solution is below 200 ppm determined according to ISO 14362-1:2017(E).
17. Method of item 2 or 3 or any one of items 4 to 16 as far as depending on item 2 or 3, wherein the concentration of the leucoindigo salt in the solution after purification or after the making is set to a range of from 5 to 65% by weight such as 10 to 60% by weight or 15 to 55 by weight or 20 to 50% by weight or 25 to 45% by weight, based on the total weight of the solution.
18. Aqueous leucoindigo salt solution comprising an aromatic amine in the form of aniline or aniline and N-methylaniline, wherein the concentration of said aromatic amine is above 200 ppm determined according to ISO 14362-1:2017(E), such as 2,000 to 10,000 ppm, wherein the leucoindigo is in the form of a mixed sodium and potassium salt, and wherein the molar ratio of sodium to potassium is in the range of from above 3:1 to 10:1, such as 3.5:1 to 10:1.
19. Aqueous leucoindigo salt solution of item 18, wherein the concentration of the salt in the solution is in the range of from 5 to 65% by weight such as from 10 to 60% by weight or 15 to 55% by weight or 20 to 50% by weight or 25 to 45% by weight, based on the total weight of the solution.

20. Aqueous leucoindigo salt solution comprising an aromatic amine in the form of aniline or aniline and N-methylaniline, wherein the concentration of the aromatic amine is below 200 ppm determined according to ISO 14362-1:2017(E), wherein said leucoindigo is in the form of a mixed sodium and potassium salt, and wherein the molar ratio of sodium to potassium is in the range of from above 3:1 to 10:1, such as 3.5:1 to 10:1.
21. Aqueous leucoindigo salt solution of claim 20, wherein the concentration of the salt in the solution is in the range of from 5 to 65% by weight such as from 10 to 60% by weight or 15 to 55% by weight or 20 to 50% by weight or 25 to 45% by weight, based on the total weight of the solution.
22. Aqueous leucoindigo solution as defined in item 20 or 21, obtainable by a method as defined in item 16 or item 17.
23. Method of making indigo, comprising step (D):
    (D) oxidizing the aqueous leucoindigo solution as defined in any one of items 20 to 22.
24. Method of item 23, comprising step (C) prior to step (D):
    (C) treating a textile with the leucoindigo solution as defined in any one of items 20 to 22.
25. Method of making indigo, comprising steps (I) and (III):
    (I) performing a method as defined in any one of items 1 to 17, preferably items 16 or 17;
    (III) oxidizing the leucoindigo solution obtained in step (I).
26. Method of item 25, comprising step (II) prior to step (III):
    (II) treating a textile with the leucoindigo solution obtained in step (I).

DETAILED DESCRIPTION OF THE INVENTION

The term "aniline-free" as used in this disclosure defines in its broadest meaning an aniline concentration below 200 ppm, or below 100 ppm, preferably below 80 ppm, more preferred below 60 ppm, still more preferred below 40 ppm, in particular below 30 ppm or below 20 ppm, and particularly preferred below 10 ppm or below 5 ppm, the concentration being determined according to ISO 14362-1:2017(E).

The term "aniline-free and N-methylaniline-free" as used in this disclosure defines an aniline concentration and an N-methylaniline concentration below 200 ppm or 100 ppm, preferably below 80 ppm, more preferred below 60 ppm, still more preferred below 40 ppm, in particular below 30 ppm or below 20 ppm, and particularly preferred below 10 ppm or below 5 ppm, the concentration being determined according to ISO 14362-1:2017(E).

Methods According to the Invention

According to a first aspect, the invention relates to a method of making an aqueous leucoindigo salt solution from indigo containing an aromatic amine, in particular aniline or aniline and N-methylaniline. For this, indigo is subjected to reduction by using an appropriate reduction agent in the presence of appropriate amounts of sodium hydroxide and potassium hydroxide.

Accordingly, the method comprises step (A):
(A) subjecting an aqueous composition comprising indigo which contains an aromatic amine in the form of aniline or aniline and N-methylaniline, to reduction in the presence of sodium hydroxide and potassium hydroxide in order to generate an aqueous leucoindigo solution comprising said aromatic amine, wherein said leucoindigo is in the form of a mixed sodium and potassium salt, wherein the molar ratio of sodium hydroxide to potassium hydroxide is in the range of from above 3:1 to 10:1.

Preferably, reduction is performed as hydrogenation. Hydrogenation may be performed by methods known in the art.

A preferred reduction method is hydrogenation using Raney-Nickel as catalyst.

Other known methods are e.g. reduction using sodium dithionite, reduction by electrolysis such as indirect electrolysis using triethanolamine complexes of iron as mediators, reduction using indoxyl, or hydroxyacetone. It should be understood that the reduction is not limited to the mentioned reduction methods.

According to the invention, the molar ratio of sodium hydroxide to potassium hydroxide is in the range of from above 3:1 to 10:1.

In a preferred embodiment, the molar ratio of sodium hydroxide to potassium hydroxide is in the range of from 4:1 to 8:1.

In a further preferred embodiment, the molar ratio is from 5:1 to 7:1.

The above ratios are also found in the leucoindigo salt purified according to the method of the invention as defined in the second aspect and third aspect below, and using the leucoindigo salt produced according to the first aspect.

The amount of sodium hydroxide and potassium hydroxide used in step (A) essentially corresponds to an amount which stoichiometrically corresponds to the amount which is necessary for the complete formation of the leucoindigo salt. Preferably, 1.5 to 2.5 mole alkalis are used per mole leucoindigo. More preferably, 2.0 to 2.5 mole alkalis are used, still more preferred 2.1 to 2.5 mole alkalis.

It is possible to provide the required amount of alkali at once prior to the hydrogenation or in portions during the hydrogenation, or prior and during the hydrogenation. If necessary, additional alkali may also be added after the hydrogenation.

Subsequently to the preparation of the crude aqueous leucoindigo salt solution, same may be purified by a suitable purification method. The methods known from the prior art mentioned in the Background section may be used, i.e. (a) distillation, (b) steam distillation, (c) extraction, (d) stripping with an inert gas, (e) subjecting the aqueous leucoindigo salt solution to a purification stream or (f) a combination of two or more thereof. This means that said aromatic amine in the form of aniline or aniline and N-methylaniline may be removed in order to generate a purified aqueous leucoindigo salt solution or an aniline-free or aniline-free and N-methylaniline-free leucoindigo solution.

Accordingly, in a second aspect, the invention relates to a method of purifying an aqueous leucoindigo salt solution comprising an aromatic amine in the form of aniline or aniline and N-methylaniline, wherein said leucoindigo is in the form of a mixed sodium and potassium salt, wherein the molar ratio of sodium to potassium is in the range of from above 3:1 to 10:1, the method comprising step (B):
(B) subjecting said aqueous leucoindigo salt solution comprising said aromatic amine to a purification step selected from the group consisting of
    (a) distillation,
    (b) steam distillation,
    (c) extraction,
    (d) stripping with an inert gas, (e) subjecting the leucoindigo salt solution to a purification stream, (f) or to a combination of two or more thereof.

According to a third aspect, the invention relates to a method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of an alkali metal salt, the method comprising at least step (B):

(B) subjecting the aqueous leucoindigo solution comprising said aromatic amine(s) to a purification step selected from the group consisting of
  (a) distillation
  (b) steam distillation
  (c) extraction
  (d) stripping with an inert gas
  (e) subjecting the leucoindigo salt solution to a purification stream
  (f) or to a combination of two or more thereof.

Purification according to step (B) is performed in the absence of oxygen in order to avoid an untimely oxidation of the leucoindico salt to indigo.

In one embodiment, the method requires that prior to step (B) an aqueous leucoindigo solution comprising an aromatic amine in the form of aniline or aniline and N-methylaniline is provided. Moreover, said leucoindigo salt has to be provided in the form of a mixed sodium and potassium salt, wherein the molar ratio of sodium to potassium is in the range from above 3:1 to 10:1.

In a preferred embodiment, the ratio is from 4:1 to 8:1.
Still more preferred is a ratio of from 5:1 to 7:1.

As used herein, the terms "sodium" and "potassium" refer to the cations thereof.

Said aqueous leucoindigo salt solution used in step (B) may be produced according to the method defined in the first aspect.

Accordingly, the method may further comprise step (A) prior to step (B):

(A) subjecting an aqueous composition comprising indigo which contains an aromatic amine in the form of aniline or aniline and N-methylaniline, to reduction, preferably hydrogenation, in the presence of sodium hydroxide and potassium hydroxide, in order to generate an aqueous leucoindigo solution comprising said aromatic amine, wherein said leucoindigo is in the form of a mixed sodium and potassium salt, wherein the molar ratio of sodium hydroxide to potassium hydroxide is in the range of from above 3:1 to 10:1.

In one embodiment of the first aspect, the second aspect and the third aspect, the concentration of the aromatic amine in the crude aqueous leucoindigo salt solution obtained in step (A) or used in step (B) prior to purification or prior to the making is above 200 ppm, based on the total weight of the solution.

In another embodiment, the concentration of said aromatic amine is above 500 ppm or 1,000 ppm or 1,500 ppm or 2,000 ppm or 2,500 ppm or 3,000 ppm or 3,500 ppm or 4,000 ppm. In one embodiment, the concentration prior to distillation is from 2,000 to 10,000 ppm.

In one embodiment, the concentration of aniline in the solution is in the range of from 2,000 ppm to 2,500 ppm, and the concentration of N-methyl aniline is in the range of from 1,000 ppm and 1,500 ppm.

In one embodiment, step (B) is performed as long as or as often as required until the concentration of the aromatic amine after purification or after the making is below 200 ppm, or below 100 ppm or below 50 ppm or below 20 ppm or below 10 ppm or below 5 ppm as determined according to ISO 14362-1:2017(E).

The term "below 100 ppm or below 100 ppm or below 50 ppm or below 20 ppm or below 10 ppm or below 5 ppm" encompasses as lower limit at which the aromatic amine is no longer detectable, i.e. 0 ppm measured according to ISO 14362-1:2017(E).

In one embodiment, step (B) is performed as long as or as often as required until the concentration of aniline is below 200 ppm.

In one embodiment, step (B) is performed as long as or as often as required until the concentration of N-methylaniline is below 20 ppm.

In one embodiment, step (B) is performed as long as or as often as required until the concentration of aniline is below 200 ppm, and the concentration of N-methylaniline is below 20 ppm, wherein the total weight of the amines does not exceed 200 ppm.

In a preferred embodiment, step (B) is performed as long as or as often as required until the concentration of aniline is below 40 ppm, and the concentration of N-methylaniline is below 5 ppm.

In a further preferred embodiment, step (B) is performed as long as or as often as required until the concentration of aniline is below 20 ppm, and the concentration of N-methylaniline is no longer detectable.

In still another preferred embodiment, step (B) is performed as long as or as often as required until the concentration of aniline is below 10 ppm, and the concentration of N-methylaniline is no longer detectable.

(a) Distillation

In a preferred embodiment, purification is performed by (a) distillation.

Distillation may also be performed in the presence of a flow of an inert gas such as nitrogen. Thus, the solution is simultaneously distilled and stripped.

During distillation, said aromatic amine is removed together with water as an azeotropic mixture.

In a preferred embodiment, the distillation is performed at normal pressure.

In another embodiment, the distillation is performed under vacuum.

In another embodiment, distillation is performed under pressure.

In one embodiment, distillation is performed using a distillation column.

The term "distillation column" as used herein is synonymously used with terms such as "distillation tower", "rectification column" or "rectification tower", "fractionating column" or "fractionating tower".

The term "column" as used herein encompasses a vertical cylindrical column. The diameter of the column is not restricted. Preferred columns have a diameter of from 30 centimeters to 3 meters and heights ranging from about 6 meters to 60 meters.

In one embodiment, the leucoindigo solution to be purified is fed into the column near the middle section or at the middle section of the column. Inside the column, the downflowing reflux liquid provides cooling and condensation of up-flowing vapors thereby increasing the efficacy of the column. The more reflux and/or more trays provided, the better is the column's separation of lower boiling materials from higher boiling materials.

During distillation, said aromatic amine is removed together with water at or near the top of the column, i.e. overhead, wherein amine and water or steam are typically condensed and collected.

The purified leucoindigo solution is collected at the bottom of the column.

In one embodiment, said purified leucoindigo solution is re-fed to the column and re-distilled.

In another embodiment, if necessary, also water may be fed to the column in order to replace water that has been distilled off overhead.

In one embodiment, bubble-cap "trays" or "plates" as are known in the art are provided inside the column in order to provide good contact between the up-flowing vapor and the down-flowing liquid inside the column.

In another embodiment, a packing material is used in the column instead of trays, especially when low pressure drops across the column are required, as when operating under vacuum. This packing material can either be random dumped packing such as Raschig rings or structured sheet metal as is known in the art.

In one embodiment, the column is operated at a continuous steady state. Unless disturbed by changes in feed, heat, ambient temperature, or condensing, the amount of feed being added normally equals the amount of product being removed.

In a preferred embodiment, the amount of heat entering the column with the feed is adjusted such that it equals the amount of heat removed by the overhead overhead fractions and with the products. By carefully adjustment, foaming, weeping, entrainment, or flooding may be prevented or at least reduced to a tolerable level.

In one embodiment, prior to purification or prior to the making performed in step (B), the concentration of indigo containing an aromatic amine in the aqueous composition used in step (A) is selected such that said leucoindigo salt is obtained in step (A) in a concentration below 25% by weight.

Accordingly, in one embodiment, the concentration of the leucoindigo salt used in step (B) is also below 25% by weight.

A concentration below 25% by weight may be beneficial since if purification by distillation is selected, during distillation, water and said aromatic amine are distilled off, thus the leucoindigo salt solution is purified and at the same time the solution is concentrated wherein a stable and purified concentrated leucoindigo salt solution may be obtained.

(b) Steam Distillation

In another preferred embodiment, distillation is performed as (b) steam distillation.

Since aromatic amines such as aniline and N-methylaniline are steam volatile due to the formation of an azeotropic mixture, said aromatic amine is removed in step (B) from the crude leucoindigo salt solution obtained in step (A) together with water.

Due to the steam distillation, the leucoindigo solution is commonly diluted by condensing steam, wherein a further diluted solution is obtained. Subsequently, excess water may be distilled off in order to concentrate the solution, wherein further aromatic amine may be removed.

In a preferred embodiment, the concentration of the leucoindigo salt solution obtained in step (B) is set to a range of from 15 to 45% by weight, preferably 25 to 45% by weight, based on the total weight of the solution, further preferred of from 25 to 35% by weight.

In one embodiment, this setting can be done either by adding or removing water, if necessary, e.g. by adding water to a solution which has been concentrated by distillation to a range above 45% by weight, or by distillation of a solution which has been diluted due to steam distillation below a concentration of 25% by weight.

In one embodiment, step (B) is performed such that the concentration of leucoindigo in the form of a mixed sodium and potassium salt in the solution after purification is above 15%, based on the total weight of the solution, preferably from 25 to 45% by weight, further preferred from 25 to 35% by weight.

In another embodiment, step (B) is performed such that the concentration of the aromatic amine after purification or after the making is below 200 ppm such as below 100 ppm or below 50 ppm or below 20 ppm or below 10 ppm or below 5 ppm, based on the total weight of the solution, and the concentration of leucoindigo in the form of a mixed sodium and potassium salt in the solution is above 25%, based on the total weight of the solution, preferably of from 25 to 45% by weight, further preferred from 25 to 35% by weight.

(c) Extraction

In another preferred embodiment, purification is performed as (c) extraction.

The term "extraction" as used herein denotes a liquid-liquid-extraction by means of which aniline or aniline and N-methylaniline are extracted from the leucoindigo solution.

Examples of solvents suitable for extraction include all essentially water-insoluble solvents which are inert under the purification conditions, such as hydrocarbons, halohydrocarbons, ethers or else alcohols or mixtures thereof.

Specific examples of suitable solvents are chloroform, dichloroethylene, perchloroethylene, dichlorofluoroethylene, chlorobenzene, methyl isopropyl ether, methyl isobutyl ether, n-butyl ether, diisoamyl ether, n-hexanol, n-octanol, 2-ethylhexanol, n-nonanol, n-decanol, isononanol (isomer mixture), isodecanol (isomer mixture), hexane, cyclohexane, octane, decane, petroleum ether of suitable boiling range, toluene, xylene, diethyl ketone, methyl isobutyl ketone, di-n-butyl ketone or cyclohexanone and also mixtures thereof.

Preferred solvents are in particular xylenes, toluene and 2-ethylhexanol.

In one embodiment, the aqueous alkaline leucoindigo solution obtained following indigo reduction is extracted at a temperature of from 25 to 100 ° C., preferably at from 40 to 70 ° C., with an inert organic solvent.

In one embodiment, the phase ratio of leucoindigo solution to solvent is from 1:1 to 1:3.

In another embodiment, the extraction period is from 10 to 30 minutes.

The solvent employed for the extraction, which contains the extractable impurities, may be redistilled and then re-used as extractant.

The process can be carried out batchwise or continuously.

In a preferred embodiment, extraction is performed using a centrifugal extractor.

The term "centrifugal extractor" as used herein is synonymously used with terms such as "centrifugal contactor" or "annular centrifugal contactor".

A centrifugal extractor uses the rotation of the rotor inside a centrifuge to mix two immiscible liquids outside the rotor, i.e. aqueous leucoindigo solution and water-insoluble solvent used for extraction, and to separate the liquids in the field of gravity inside the rotor. This way, a centrifugal extractor generates a continuous extraction of aniline or aniline and N-methylaniline from one liquid phase, i.e. the leucoindigo solution, into another liquid phase, i.e. the water-insoluble organic solvent.

(e) Subjecting the Leucoindigo Solution to a Purification Stream

In another preferred embodiment, purification is performed as (e) subjecting the leucoindigo solution to a purification stream.

The method comprises at least steps (α) to (γ):
- (α) providing a liquid stream comprising said aqueous leucoindigo solution comprising said amine(s);
- (β) providing a purification stream;
- (γ) bringing into contact said liquid stream with said purification stream.

In one embodiment, the invention relates to a method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of an alkali metal salt, the method comprising at least steps (α) to (ε):
- (α) providing a liquid stream comprising said aqueous leucoindigo solution comprising said amine(s);
- (β) providing a purification stream;
- (γ1) feeding said liquid stream and
- (γ2) feeding said purification stream into a device configured to bring into contact said liquid stream with said purification stream;
- (δ) discharging from the device at least a portion of said purification stream that has contacted said liquid stream; and
- (ε) discharging from the device at least a portion of said liquid stream that has been contacted by said purification stream.

According to the invention, step (α) requires providing a liquid stream comprising said aqueous leucoindigo solution comprising said amine(s). Said providing preferably is performed by discharging a leucoindigo salt solution from a respective storage container or directly from a reduction device in which the leucoindigo salt solution is made by reduction of indigo. The discharged solution is in a flowing condition, e.g. either under the influence pressure, gravity or a pump, and thus forms a stream. Preferably, the flow of the solution is directed via a pipe to the device used in step (γ1).

Further according to the invention, step (β) requires providing a purification stream. Said providing preferably is performed by discharging a suitable purification liquid or purification vapor from a respective storage container. The discharged purification liquid or vapor is in a flowing condition, e.g. either under the influence pressure, gravity or a pump, and thus forms a stream. Preferably, the flow of the solution or vapor is directed via a pipe to the device used in step (γ2).

The term "purification stream" provided in step (β) denotes any substance being suitable to remove or at least to lower the content of aniline or aniline and N-methylaniline in a leucoindigo solution comprising said amine(s), wherein said leucoindigo is in the form of a salt.

In one embodiment, said purification stream may be a liquid, i.e. a purification liquid. Preferably, as purification liquid the solvents may be used mentioned above in item (c) extraction. Accordingly, in said embodiment, (e) subjecting the leucoindigo solution to a purification stream may be performed as (c) extraction.

In a preferred embodiment, said purification stream is generated from a vapor which may then also be denoted as purification vapor.

Said vapor may be generated and kept under pressure in a suitable container, wherein upon release of vapor from said container said vapor is in a flowing condition, thus forming a stream. Preferably, the released vapor is directed through a pipe to the device used in step (γ2).

The term "vapor" as used herein encompasses or denotes a substance or compound in the gas phase. Typically, such vapor is produced by heating a substance or compound above its boiling point. The term "vapor" also encompasses a compound or substance which is present in form of small droplets dispersed in a gas phase, and thus forms an aerosol.

In one embodiment, said vapor or vapor stream is or comprises an inert gas.

In another embodiment, said vapor or vapor stream is or comprises a gaseous organic solvent which is not miscible with water.

In still another embodiment, said vapor or vapor stream is or comprises steam.

Accordingly, in one embodiment, said vapor or vapor stream is or comprises an inert gas, a gaseous organic solvent which is not miscible with water, or steam, or two or three thereof.

A suitable inert gas is nitrogen.

A gaseous organic solvent which is not miscible with water may be selected from a hydrocarbon.

In one embodiment, if said purification stream is or comprises an inert gas, (e) subjecting the leucoindigo solution to a purification stream may be performed as (d) stripping with an inert gas.

In another embodiment, if said purification stream is or comprises a gaseous organic solvent which is not miscible with water, (e) subjecting the leucoindigo solution to a purification stream may be performed as (d) stripping with a gaseous organic solvent which is not miscible with water.

The term "steam" as used herein denotes vaporized water.

In a preferred embodiment, said vapor or vapor stream comprises steam or is steam.

In one embodiment, if said purification stream is or comprises steam, (e) subjecting the leucoindigo solution to a purification stream may be performed as (b) steam distillation.

In one embodiment, said vapor or vapor stream comprises steam and nitrogen or consists of steam and nitrogen.

In one embodiment, said steam is generated by heating water in a pressure vessel to a temperature of 100° C. or above 100° C. High pressure steam at approx. 10 bars and 200° C., or low pressure steam at approx. 0.5 bars and 100° C. may be used in the method according to the invention.

In a preferred embodiment, said steam is additionally or alternatively generated by heating at least a portion of said liquid stream that has been discharged from the device according to step (ε). For heating, e.g. a heat exchanger may be used.

In one embodiment, the amount of heat entering the device generated from the purification stream fed according to step (γ2) and heat entering with the liquid stream fed according to step (γ1) is controlled such that it equals the amount of heat removed in steps (δ) and (ε) since addition of excess or insufficient heat to the device can lead to foaming or flooding. Accordingly, the method is performed such to achieve adiabatic conditions.

In another embodiment, the amount of heat entering the device generated from the heated portion of said liquid stream that has been discharged from the device according to step (ε) and heat entering with the liquid stream fed according to step (γ1) is controlled such that it equals the amount of heat removed in steps (δ) and (ε) since addition of excess or insufficient heat to the device can lead to foaming or flooding. Accordingly, the method is performed such to achieve adiabatic conditions.

Further according to the invention, steps (γ1) and (γ2) require feeding said liquid stream and said purification stream into a device configured to bring into contact said liquid stream with said purification stream such as a vapor stream.

In one embodiment, said device comprises a liquid stream inlet or liquid stream inlets for feeding the liquid stream, and a purification stream inlet or purification stream inlets such as a vapor stream inlet or vapor stream inlets for feeding the purification stream such as a vapor stream.

The inlets may be provided at any location of the device, i.e. the inlets may be provided at the bottom or the top or at the sidewalls of the device.

In one embodiment, the liquid stream inlet(s) is/are provided at the bottom of the device, and the purification stream inlet(s) at the top, or vice versa.

In another embodiment, the liquid stream inlet(s) is/are provided at sidewalls of the device, and the purification stream inlet(s) at the bottom or the top of the device.

In another embodiment, the purification stream inlet(s) is/are provided at sidewalls of the device, and the liquid stream inlet(s) at the bottom or the top of the device.

Preferably, the purification stream inlet(s) and/or the liquid stream inlet(s) is/are designed in the form of a sparger or spargers. The use of perforated sheets as purification stream inlets and/or liquid stream inlets is also possible.

In one embodiment, the bringing into contact is performed such that the device is partly or completely filled with liquid originating from the liquid stream, and the purification stream inlet(s) is/are arranged such that the fed purification stream necessarily must flow through the liquid.

In another embodiment, the liquid stream and purification stream inlet(s) are arranged such that the streams cross each other.

In another embodiment, the bringing into contact of the streams may be performed in a counter-current manner.

In another embodiment, the bringing into contact of the streams may be performed in a co-current manner, e.g. when liquid and purification inlet(s) are identical, i.e. the streams are fed via a common inlet or common inlets.

In another embodiment, the device contains means for guiding the liquid stream and the purification stream such that they contact one another. Such means are known in the art. Exemplarily mentioned are plates and filling materials such as Raschig rings.

The term "plate" as used herein is synonymously used with the term "tray".

The term "filling material" as used herein is synonymously used with the term "packing".

According to the invention, step (δ) requires discharging from the device at least a portion of said purification stream such as a vapor stream that has contacted said liquid stream.

Accordingly, in one embodiment, said device comprises a purification stream outlet or purification stream outlets for discharging at least a portion of said purification stream that has contacted said liquid stream.

Further according to the invention, step (ε) requires discharging from the device at least a portion of said liquid stream that has been contacted by said purification stream such as a vapor stream.

Accordingly, in one embodiment, said device comprises a liquid stream outlet or liquid stream outlets for discharging at least a portion of said liquid stream that has been contacted by said purification stream such as a vapor stream.

Basically, the outlets may be arranged in a manner as discussed with respect to the purification stream and liquid stream inlets, i.e. at the bottom, at the top, or at the sidewalls of the device.

In a preferred embodiment, the purification stream inlet(s) is/are arranged at a lower portion of the device, and the liquid stream inlet(s) are arranged at an upper portion of the device.

In a corresponding preferred embodiment, the purification stream outlet(s) such as vapor outlet(s) is/are arranged at an upper portion of the device, and the liquid stream outlet(s) are arranged at a lower portion of the device.

In a particularly preferred embodiment, the purification stream inlet(s) is/are arranged at the bottom of the device, and the liquid stream inlet(s) are arranged at the top of the device.

In a corresponding particularly preferred embodiment, the purification stream outlet(s) is/are arranged at the top of the device, and the liquid stream outlet(s) are arranged at the bottom of the device.

Accordingly, in a preferred embodiment, said liquid stream and said purification stream such as a vapor stream are counter-current streams.

In a further preferred embodiment, said liquid stream and said purification stream such as a vapor stream are counter-current streams, wherein the liquid stream flows downwards, and the purification stream flows upwards.

The purification stream such as a vapor stream discharged from the purification outlet(s) such as vapor outlet(s) comprises aniline or aniline and N-methylaniline.

The result of the method according to the invention is that the concentration of aniline or aniline and N-methylaniline of the liquid stream discharged according to step (ε) from the liquid stream outlet(s) is lower than the concentration of aniline or aniline and N-methylaniline of the liquid stream fed to the device according to step (γ1) via the liquid stream inlet(s).

In one embodiment, temperature and flow rate of the purification stream such as a vapor stream fed into the device according to step (γ2) are selected such that the split ratio is below 70%.

The term "split ratio" as used herein denotes the ratio of the total quantity of purification stream such as a vapor stream discharged from the device according to step (δ) to the total quantity of the liquid stream fed to the device according to step (γ1) expressed in percent (liquid stream fed to the device according to step (γ1)=100%).

In a preferred embodiment, the split ratio is below 60%, more preferred below 40%, still more preferred below 30% or below 20% or below 10%.

In another preferred embodiment, the split ratio is in the range of from 60 to 5%, further preferred 50 to 5% or 40 to 5% or 30 to 5% or 20 to 5% or 10 to 5%.

In a preferred embodiment, steps (α) to (ε) are performed simultaneously, i.e. the process is a continuous process.

In another embodiment, the process may be performed discontinuously, i.e. as a batch process. In one embodiment, the device is filled with liquid provided by the liquid stream according to step (γ1). Subsequently, steps (γ2) and (δ) are performed. Subsequent to the contacting according to step (δ), the purified leucoindigo solution is discharged from the device according to step (ε). The method may be repeated.

In a preferred embodiment, the device used in the method according to the invention is a column or comprises a column.

Columns

The term "column" as used in (e) subjecting the leucoindigo solution to a purification stream encompasses a hollow structural element, preferably a hollow cylindrical element, wherein the length exceeds the diameter. Neither the diameter nor the length is limited.

In one embodiment, length and diameter or the ratio of length to diameter of the column may be freely selected or may be optimized in view of the result to be achieved.

Preferably, the diameter is in the range of from 0.1 to 4 meters.

Preferably, the length is in the range of from 1 to 50 meters such as 1 to 30 meters.

In another embodiment, the diameter is in the range of from 0.1 to 4 meters and the length is in the range of from 1 to 30 meters.

In one embodiment, the column as defined herein is designed to be straight.

In another embodiment, the column as defined herein is designed not to be straight.

In another embodiment, the column is arranged in a horizontal manner.

In another embodiment, the column is arranged in a perpendicular manner.

In another embodiment, the column is provided in the form of a coil.

The arrangement in a perpendicular manner is preferred.

The column used in the method of the invention comprises n theoretical stages. The term "theoretical stage" as used herein encompasses a hypothetical zone or stage in which two phases, such as the liquid phase originating from the liquid stream and the purification phase such as a vapor phase originating from the purification stream as defined herein, establishes in the column an equilibrium with each other. Such equilibrium stages may also be referred to as an equilibrium stage or an ideal stage.

The number of theoretical stages required in the method according to the invention may depend on the particular type of column used. It may be determined according to methods known in the art, taking into account the desired degree of separation of aniline or aniline and N-methylaniline in the output fraction(s), i.e. obtained in in steps (δ) and (ε). It also may depend upon the amount of reflux used.

The final design choice of the number of stages to be applied in an industrial realization may then be selected based upon an economic balance between the cost of additional stages and the cost of using a higher reflux rate.

In one embodiment, the column may have from 5 to 50 theoretical stages.

In another embodiment, the column may have from 10 to 40 theoretical stages.

In one embodiment, the column may be operated at reduced pressure.

In another embodiment, the column may be operated at a pressure substantially equal to atmospheric pressure.

In still another embodiment, the column may be operated at a pressure above atmospheric pressure.

In one embodiment, the column may work at a reduced pressure such as a pressure in the range of from $0.1*10^5$ Pa absolute (0.10 bara) to $0.95*10^5$ Pa absolute (0.95 bara). In such conditions, the temperature of the column may be set in a range of from 40° C. to 95° C.

In another embodiment, the column may work at a pressure substantially equal to atmospheric pressure, i.e. in a range of $0.95*10^5$ Pa absolute (0.95 bara) to $1.2*10^5$ Pa absolute (1.2 bara). In such conditions, the temperature of the column is typically set in a range of from 95° C. to 110° C.

In a further embodiment, the column may be operated using pressures above atmospheric pressure, optionally under a pressure of $1.2*10^5$ Pa absolute (1.2 bara) to $11*10^5$ Pa absolute (11 bara) e.g. at $7*10^5$ Pa absolute (7 bara). The temperature of the column may be then set in a range 110° C. to 190° C., e.g. in the range of 160° C. to 170° C.

The temperatures quoted are measured at the bottom of the column and are dependent upon the quantity of vapor leaving the column at the top.

For heating, in one embodiment, a space heater is used. The term "space heater" as used herein encompasses a device used to heat a single, small area, e.g. the region of the bottom of the column. Accordingly, said space heater is preferably arranged at or near the bottom of the column.

In another embodiment, upper regions of the column are heated.

In another embodiment, the bottom and the upper regions of the column are heated.

If steam is used as purification or vapor feed according to step (γ2), aniline is accompanied with water when leaving the column in the vapor phase according to step (δ). The vapor comprising aniline and water vapor coming from the column may be condensed and cooled. The condensate may thereafter be separated in an aqueous phase, comprising water and aniline.

Some of the condensate may be returned to the top of the column, where it is used to knock down droplets and optionally solids in the vapor phase, which phase is to leave the column. This knocking down can be done using preferably a trayed section, although also a structured packing section might be used.

The device may be provided with defoaming means such as baffles, preferably installed in the lower part of the used column, if necessary at all.

In another embodiment, defoaming may be supported adding a defoamer to the leucoindigo solution to be purified. Although heterogeneous defoamers such as silicon oils may be used, it is preferred to use homogeneous defoamers which are dissolved in the leucoindigo solution, and which do not negatively affect the later oxidation of the purified leucoindigo to indigo.

Specifically, according to the invention, the device used in steps (γ1) and (γ2) is selected from the group consisting of plate column, packed column, and bubble column, or two or three thereof, or two or more of any of said columns.

The term "plate column" as used herein is synonymously used with the term "frayed tower" or "tray column".

Plate columns, packed columns, and bubble columns are known in the art.

In one embodiment, the column contains a sequence or sequences which is/are designed as plate column and a sequence or sequences which is/are designed as packed column in order to further optimize the method.

In another embodiment, the column contains a sequence or sequences which is/are designed as plate column and a sequence or sequences which is/are designed as packed column and a sequence or sequences which are designed as bubble column in order to further optimize the method.

In another embodiment, the column contains a sequence or sequences which is/are designed as plate column and a sequence or sequences which are designed as bubble column in order to further optimize the method.

In another embodiment, the column contains a sequence or sequences which is/are designed as packed column and a sequence or sequences which are designed as bubble column in order to further optimize the method.

In another embodiment, several plate columns, packed columns, or bubble columns, respectively, are connected in series in order to further optimize the method.

In another embodiment, a plate column is connected with a packed column or a bubble column in order to further optimize the method.

In another embodiment, a packed column is connected with a bubble column in order to further optimize the method.

In another embodiment, a plate column is connected with a packed column in order to further optimize the method.

In another embodiment, a plate column is connected with a packed column and a bubble column in order to further optimize the method.

In still another embodiment, a pre-purification is performed as disclosed in the prior art, wherein the final purification is performed with the method according to the invention.

The term "pre-purification" as used herein encompasses distilling off water from a respective leucoindigo salt solution, the extraction with a suitable organic solvent, a steam distillation or the stripping with nitrogen, or two or more thereof.

It is matter of course that in the method according to the invention presence of oxygen has to be excluded in order to prevent untimely oxidation of leucoindigo to indigo.

The used columns are discussed in the following in more detail.

Plate Column

In one embodiment, the device is a plate column.

In a preferred embodiment, the plate column is arranged in the form of a tower, i.e. it is arranged in a perpendicular manner.

In one embodiment, the height of the column is more than 5 meters, preferably 5 to 50 meters, and more preferred 10 to 40 meters.

In connection with a plate column, the theoretical stages are also termed as theoretical trays or theoretical plates.

The trays or plates are preferably fabricated of circular steel plates and usually installed inside the column at intervals of about 60 to 75 cm up the height of the column.

In one embodiment, the tray is a bubble-cap tray or a valve-cap tray.

The term "bubble-cap tray" as used herein encompasses a slotted cap on a central riser, wherein the gas flows up through the riser, and reverse flow is under the cap, passes downward through the annulus between riser and cap, and finally passes into the liquid through a series of openings or slots in the lower side of the cap.

The term "valve-cap tray" as used herein encompasses a tray with perforations which are covered by liftable caps. Vapor flow lifts the caps, thus self-creating a flow area for the passage of vapor. The lifting cap directs the vapor to flow horizontally into the liquid.

In one embodiment, the tray is a perforated tray, i.e. a sieve tray. The term "sieve tray" encompasses a tray in which the desired contacting between vapor and liquid occurs as the vapor, flowing upwards through the perforations, comes into contact with the liquid flowing downwards through the perforations.

In one embodiment, contacting is achieved by installing bubble-caps or valve caps at each perforation to promote the formation of vapor bubbles flowing through a thin layer of liquid maintained by a weir on each tray.

Accordingly, in one embodiment, the trays may be selected from perforated trays, bubble-cap trays or valve-cap trays, or two or three thereof.

Perforated trays, bubble-cap trays or valve-cap trays are known in the art.

In one embodiment, the feed to the plate column comprises or is a liquid stream provided according to step ($\alpha$) and a purification stream such as a vapor stream provided according to step ($\beta$) which are fed into the column according to steps ($\gamma 1$) and ($\gamma 2$). Thus, two phases prevail inside the column, namely a vapor phase generated from the purification stream, and one liquid phase generated from the liquid stream. The liquid phase flows preferably downward through the column via gravity, while the vapor phase flows upward. These two phases come in contact in correspondence of holes, valves or bubble caps that fill the area of the plates. Vapor moves to the higher plate through these devices, while the liquid moves to the lower plate through e.g. a downcomer.

The liquid is collected at the bottom of the column while the vapor is collected at the top. The liquid and vapor produced at the top and at the bottom may be recirculated.

The vapor collected at the top according to step ($\delta$) contains aniline or aniline and N-methylaniline which have been removed from the leucoindigo solution.

The liquid collected at the bottom according to step ($\epsilon$) contains the purified leucoindigo solution.

Packed Column

In one embodiment, the plates of the plate column as disclosed above are replaced by packed sections, i.e. by sections comprising a filling material. Accordingly, the device used for purification is then a packed column.

In one embodiment, the packings may have a regular geometry such as stacked rings, grids, or proprietary structured rings, or saddles.

Rings are e.g. Raschig rings or pall rings.

Saddles may e.g. be Intalox® saddles.

In one embodiment, the packings may have an irregular shape.

The packings may be randomly arranged in the column, wherein rings, saddles, and proprietary shades are dumped into the column and take a random arrangement.

In another embodiment, the packings may be regularly arranged in the column.

Rings, saddles or proprietary structured shades may be made from a variety of materials such as ceramics, metals, plastics, and carbon.

In one embodiment, the use of structured packings such as wire mesh or perforated sheets is also possible.

The necessary height of the packing may be determined according to methods known in the art.

In one embodiment, the feed to the packed column comprises or is a liquid stream provided according to step ($\alpha$) and a purification stream such as a vapor stream provided according to step ($\beta$), which are fed into the column according to steps ($\gamma 1$) and ($\gamma 2$). Thus, two phases prevail inside the column, namely a vapor phase generated from the purification stream, and one liquid phase generated from the liquid stream. The liquid phase flows preferably downward through the column via gravity, while the vapor phase flows upward. These two phases come in contact in correspondence of the packings or the filling materials of the packed column. Vapor moves to the higher packings through these devices, while the liquid move to the lower packings through e.g. a downcomer.

The liquid is collected at the bottom of the packed column while the vapor is collected at the top. The liquid and vapor produced at the top and at the bottom may be recirculated.

The vapor collected at the top according to step (δ) contains aniline or aniline and N-methylaniline which have been removed from the leucoindigo solution.

The liquid collected at the bottom according to step (ε) contains the purified leucoindigo solution.

Bubble Column

In one embodiment, the plates or the packings as disclosed in connection with a plate column or a packed column are removed from the column.

Accordingly, the device may be designed as a bubble column.

The term "bubble column" as used herein is synonymously used with the term "bubble column reactor".

In its most simple form a bubble column as used in the method according to the invention consists of a vertical cylinder with a vapor distributor at the purification stream inlet. Such bubble column may be designed as a single-stage bubble column.

The vapor phase provided by the purification stream or vapor stream according to step (β) is dispersed by the distributor into bubbles entering the liquid phase.

The liquid phase provided by the liquid stream according to step (α) may move co-currently or counter-currently to the flow of the vapor stream.

In one embodiment, the feed to the bubble column comprises or is a liquid stream provided according to step (α) and a vapor stream provided according to step (B), which are fed into the column according to steps (γ1) and (γ2). Thus, two phases prevail inside the column, namely a vapor phase generated from the purification stream, and one liquid phase generated from the liquid stream. The liquid phase flows preferably downward through the column via gravity, while the vapor phase flows upward.

The liquid is collected at the bottom of the bubble column while the vapor is collected at the top. The liquid and vapor produced at the top and at the bottom may be recirculated.

The vapor collected at the top according to step (δ) contains aniline or aniline and N-methylaniline which have been removed from the leucoindigo solution.

The liquid collected at the bottom according to step (ε) contains the purified leucoindigo solution.

As is known, the efficacy of a bubble column may depend on the shape and velocity of the bubbles. In one embodiment, the ranges of liquid and vapor superficial velocities, based on empty reactor cross-sectional area, are selected such to be in the region of 0 to 3 cm/s and 3 to 25 cm/s, respectively.

In one embodiment, said bubble column preferably contains means for controlling the bubbles, i.e. it preferably contains a flow control system.

Furthermore, the properties such as the velocity, shape and area of the bubbles may be studied by known image processing techniques in order to optimize the efficacy of the bubble column.

In one embodiment, the ratio between length and diameter of the bubble reactor is between 3 and 10.

In other embodiments, the design of a single-stage bubble column may be varied according to respective columns known in the art.

In one embodiment, the bubble column may be designed as a multi-stage bubble column, i.e. a bubble column cascade. In one embodiment, said cascade may comprise sieve trays.

In another embodiment, the bubble column may be designed as a loop reactor such as a mammoth loop reactor or a jet loop reactor.

Aqueous Leucoindigo Salt Solutions

According to a fourth aspect, the invention relates to an aqueous leucoindigo salt solution comprising an aromatic amine in the form of aniline or aniline and N-methylaniline, wherein the concentration of the aromatic amine in the solution is above 200 ppm, wherein the leucoindigo salt in the solution is in the form of a mixed sodium and potassium salt, and wherein the molar ratio of sodium to potassium is in the range of from above 3:1 to 10:1.

In one embodiment, the concentration of the salt in the non-purified solution is 35% by weight, based on the total weight of the solution, preferably of from 25 to 35% by weight.

In another embodiment, the concentration of the salt in the non-purified solution is 25% by weight, based on the total weight of the solution, preferably of from 15 to 25% by weight.

According to a fifth aspect, the invention relates to an aqueous leucoindigo salt solution comprising an aromatic amine in the form of aniline or aniline and N-methylaniline, wherein the concentration of the aromatic amine in the solution is below 200 ppm such as below 100 ppm or below 50 ppm or below 20 ppm or below 10 ppm or below 5 ppm, and wherein the leucoindigo in the solution is in the form of a mixed sodium and potassium salt, wherein the molar ratio of sodium to potassium is in the range of from above 3:1 to 10:1.

In a preferred embodiment, the concentration of the salt in the purified solution is from 5 to 65% by weight such as 10 to 60% by weight or 15 to 55% by weight or 20 to 50% by weight or 25 to 45% by weight, based on the total weight of the solution, further preferred from 25 to 35% by weight.

In one embodiment, the invention relates to an aqueous leucoindigo salt solution as defined above, obtainable by a method as defined in the second aspect.

Use of the Aqueous Leucoindigo Solution According to the Invention

The solution defined in the fifth aspect may be used for preparing indigo.

Thus, according to a sixth aspect, the invention relates to a method of making indigo, comprising step (D):
(D) oxidizing the aqueous leucoindigo solution as defined in the fifth aspect The oxidation methods known from the respective prior art may be used for oxidation.

In a preferred embodiment, said oxidation is performed in the presence of a textile which has been treated with said leucoindigo salt solution obtained in the method as defined in the fifth aspect.

Accordingly, the invention also relates to a method of making indigo, wherein step (D) comprises step (C) prior to step (D):
(C) treating a textile with the leucoindigo solution as defined in the fifth aspect.

In one embodiment, the invention relates to a method of making indigo, comprising steps (I) and (III):
(I) performing a method as defined in the first aspect or the second aspect or any one of the embodiments defined therein;
(III) oxidizing the leucoindigo solution obtained in step (I).

In one embodiment, the method comprises step (II) prior to step (III):

(II) treating a textile with the leucoindigo solution obtained in step (I).

EXAMPLES

Example 1

1311 g of an aqueous indigo suspension containing 262 g indigo (concentration 20% by weight) were hydrogenated in the presence of 78 g sodium hydroxide and 19 g potassium hydroxide and 6 g Raney-Nickel at 70° C. and 2 bar pressure. After finalizing the reaction, the reaction mixture was cooled down and the pressure was released. An aqueous alkaline solution of leucoindigo in a concentration of 20% by weight based on the total weight of the solution was obtained. The aniline content measured according to ISO 14362-1:2017(E) was 2,585 ppm and the N-methylaniline content 1,276 ppm.

Example 2

1000 g of the solution obtained in Example 1 were subjected to distillation at normal pressure. After 540 g water had been distilled off, a 31% by weight solution was obtained. The solution was stable at 23° C. The aniline content measured according to ISO 14362-1:2017(E) was 195 ppm and the N-methylaniline content 3.3 ppm.

Example 3 (Comparative)

1,000 g of a 30% by weight leucoindigo solution (containing 6.5% by weight alkali metal, 2,495 ppm aniline and 1,480 ppm N-methylaniline) were subjected to distillation at ambient pressure. After 470 ml water had been distilled off, a 57% by weight solution was obtained. The content of aniline in the obtained concentrated solution was 173 ppm and the N-methylamine concentration was 9 ppm determined according to ISO 14362-1:2017(E).

Example 4

1,000 g water was added to 2,000 g of a 30% by weight leucoindigo solution (containing 6.5% by weight alkali metal, 2,356 ppm aniline and 1,258 ppm N-methylaniline). Subsequently, the composition was subjected to distillation at ambient pressure. After 2,000 ml water had been distilled off, a 60% by weight solution was obtained. The content of aniline in the obtained concentrated solution was 38 ppm and the N-methylamine concentration was not detectable according to ISO 14362-1:2017(E).

Example 5

2,000 g water was added to 2,000 g of a 30% by weight leucoindigo solution (containing 6.5% by weight alkali metal, 2,350 ppm aniline and 1,335 ppm N-methylaniline). Subsequently, the composition was subjected to distillation at ambient pressure. After 3,000 ml water had been distilled off, a 60% by weight solution was obtained. The content of aniline in the obtained concentrated solution was 16 ppm and the N-methylamine concentration was not detactable determined according to ISO 14362-1:2017(E).

Example 6

3,000 g water was added to 2,000 g of a 30% by weight leucoindigo solution (containing 6.5% by weight alkali metal, 2,164 ppm aniline and 1,170 ppm N-methylaniline). Subsequently, the composition was subjected to distillation at ambient pressure. After 4,000 ml water had been distilled off, a 60% by weight solution was obtained. The content of aniline in the obtained concentrated solution was 5 ppm determined according to ISO 14362-1:2017(E). N-methylamine was not detectable.

Example 7

1,000 g of the leucoindigo solution obtained in Example 4 were diluted with 500 g water to result in a 40% by weight solution. This solution had an aniline content below 5 ppm determined according to ISO 14362-1:2017(E). The solution was used in vat dyeing and provided for deep shades.

Example 8

2,000 g of a 30% by weight leucoindigo solution (containing 6.5% by weight alkali metal, 2,164 ppm aniline and 1,170 ppm N-methylaniline) were subjected to distillation at ambient pressure. Simultaneously to distillation, 3,000 ml water were slowly added. After 4,000 ml water had been distilled off, a 60% by weight solution was obtained. The content of aniline in the obtained concentrated solution was 5 ppm determined according to ISO 14362-1:2017(E). N-methylamine was not detectable.

Example 9

A cylindrical multiple plate column having a diameter of 0.10 m and a height of 3 m and being provided at the bottom thereof with a space heater was under inert condition filled with 5-10 kg of the leucoindigo solution used as starting material of Example 8. The space heater was set such that the liquid at the bottom of the column was heated to a temperature of 95-110° C. Then, high pressure steam was inserted into the liquid via a sparger at the bottom of the column. Steam exiting the column at the top was collected and condensed. After 2-4 hours the content of the column was discharged. The obtained solution was aniline-free and N-methylaniline-free as determined according to ISO 14362-1:2017(E).

Example 10

The column used in Example 9 was purged and kept under inert conditions. The space heater was set such that the liquid at the bottom of the column was heated to a temperature of 95-110° C. The temperature was controlled during the experiment. The column was filled with 5-10 kg of the leucoindigo solution used in Example 9. Further leucoindigo solution was transferred into a feeding vessel which was kept at 25° C. The solution was fed to the column via a pump. Simultaneously, high pressure steam was inserted into the column via a sparger at the bottom of the column. Purified solution was then continuously collected from the column.

Purification settings, such as temperature and flow rate, were selected in the way that various splits were achieved in the range of 10-60%. The mass balance and split were determined based on the amounts of distillate and residue collected.

Samples from the bottom of the column were analyzed in terms of aniline/N-methylaniline (NMA) content determined according to ISO 14362-1:2017(E). The solution was aniline-free and N-methylaniline-free as determined according to ISO 14362-1:2017(E).

The invention claimed is:

1. Method of making an aqueous leucoindigo salt solution, the method comprising:
subjecting an aqueous composition comprising indigo which contains an aromatic amine in the form of aniline or aniline and N-methylaniline, to reduction in the presence of sodium hydroxide and potassium hydroxide in order to generate an aqueous leucoindigo solution comprising said aromatic amine, wherein said leucoindigo is in the form of a mixed sodium and potassium salt, wherein the molar ratio of sodium to potassium is in the range of from 4:1 to 8:1.

2. Aqueous leucoindigo salt solution comprising an aromatic amine in the form of aniline or aniline and N-methylaniline, wherein the concentration of aromatic amine is above 200 ppm wherein the leucoindigo is in the form of a mixed sodium and potassium salt, and wherein the molar ratio of sodium to potassium is in the range of from 4:1 to 8:1 .

3. Aqueous leucoindigo salt solution of claim 2, wherein the concentration of the salt in the solution is in the range of from 5 to 65% by weight, based on the total weight of the solution.

4. Aqueous leucoindigo salt solution comprising an aromatic amine in the form of aniline or aniline and N-methylaniline, wherein the concentration of the aromatic amine is below 200 ppm, wherein said leucoindigo is in the form of a mixed sodium and potassium salt, and wherein the molar ratio of sodium to potassium is in the range of from 4:1 to 8:1 .

5. Aqueous leucoindigo salt solution of claim 4, wherein the concentration of the salt in the solution is in the range of from 5 to 65% by weight, based on the total weight of the solution.

6. Method of claim 1 wherein subjecting the aqueous composition comprising indigo which contains an aromatic amine in the form of aniline or aniline and N-methylaniline, to hydrogenation in the presence of sodium hydroxide and potassium hydroxide.

7. Method of claim 2 wherein the concentration of aromatic amine is 2,000 to 10,000 ppm.

8. Method of purifying an aqueous leucoindigo solution comprising an aromatic amine in the form of aniline or N-methylaniline or aniline and N-methylaniline, wherein said leucoindigo is in the form of a mixed sodium and potassium salt, wherein the molar ratio of sodium to potassium is in the range of from 4:1 to 8:1, the method comprising:
subjecting the aqueous leucoindigo solution comprising said aromatic amine to a purification step selected from
(a) distillation;
(b) steam distillation;
(c) extraction;
(d) stripping with an inert gas;
(e) subjecting the leucoindigo solution to a purification stream; or
(f) a combination of two or more thereof.

9. Method of claim 8, wherein
(a) distillation is performed using a column provided with trays or packing materials;
(c) extraction is a liquid-liquid-extraction using a centrifugal extractor;
(e) subjecting the leucoindigo solution to a purification stream comprises at least steps ($\alpha$) to ($\gamma$):
($\alpha$) providing a liquid stream comprising said aqueous leucoindigo solution comprising said amine(s);
($\beta$) providing a purification stream;
($\gamma$) bringing into contact said liquid stream with said purification stream.

10. Method of claim 9, wherein step ($\gamma$) comprises steps ($\gamma$1) and ($\gamma$2), and the method further comprises steps ($\delta$) and ($\epsilon$):
($\gamma$1) feeding said liquid stream and
($\gamma$2) feeding said purification stream
into a device configured to bring into contact said liquid stream with said purification stream;
($\delta$) discharging from the device at least a portion of said purification stream that has contacted said liquid stream; and
($\epsilon$) discharging from the device at least a portion of said liquid stream that has been contacted by said purification stream.

11. Method of claim 10, wherein the liquid stream and the purification stream are counter-current streams.

12. Method of claim 9, wherein the purification stream is a vapor stream.

13. Method of claim 12, wherein said vapor stream comprises an inert gas, a gaseous organic solvent which is not miscible with water, or steam, or two or three thereof.

14. Method of claim 10, wherein the device is selected from a plate column, packed column, or bubble column, or two or three thereof, or two or more of any of said columns.

15. Method of claim 13, wherein said steam is generated by heating at least a portion of said liquid stream that has been discharged from the device according to step (c).

16. Method of claim 10, wherein steps ($\alpha$) to ($\epsilon$) are performed simultaneously.

17. Method of claim 8, comprising, prior to subjecting the aqueous leucoindigo solution comprising said aromatic amine to a purification step,
subjecting an aqueous composition comprising indigo which contains an aromatic amine in the form of aniline or aniline and N-methylaniline, to reduction in the presence of sodium hydroxide and potassium hydroxide in order to generate an aqueous leucoindigo solution comprising said aromatic amine, wherein said leucoindigo is in the form of a mixed sodium and potassium salt, wherein the molar ratio of sodium hydroxide to potassium hydroxide is in the range of from 4:1 to 8:1.

18. Method of claim 8, wherein the concentration of said aromatic amine in the solution prior to purification is above 200 ppm.

19. Method of claim 8, wherein the distillation is selected from distillation at normal pressure, distillation under vacuum and steam distillation, or a combination of two or three thereof.

20. Method of claim 8, wherein the method is performed as long as or as often as required until after purification of the aromatic amine in the solution is below 200 ppm.

21. Method of claim 8, wherein the concentration of the leucoindigo salt in the solution after purification is set to a range of from 5 to 65% by weight, based on the total weight of the solution.

22. Method of claim 8 further comprising oxidizing the aqueous leucoindigo solution.

23. Method of claim 22 further comprising, prior to oxidizing the aqueous leucoindigo solution, treating a textile with the leucoindigo solution.

24. Method of making an aqueous aniline-free or aniline-free and N-methylaniline-free leucoindigo solution from an aqueous leucoindigo solution comprising aniline or aniline and N-methylaniline, wherein said leucoindigo is in the form of a mixed sodium and potassium salt, wherein the molar ratio of sodium to potassium is in the range of from 4:1 to 8:1, the method comprising:

subjecting the aqueous leucoindigo solution comprising said aromatic amine(s) to a purification step selected from (a) distillation;
(b) steam distillation;
(c) extraction;
(d) stripping with an inert gas;
(e) subjecting the leucoindigo solution to a purification stream; or
(f) a combination of two or more thereof.

\* \* \* \* \*

UNITED STATES PATENT AND TRADEMARK OFFICE
CERTIFICATE OF CORRECTION

PATENT NO. : 11,384,245 B2
APPLICATION NO. : 16/637862
DATED : July 12, 2022
INVENTOR(S) : Erwin Lucic et al.

It is certified that error appears in the above-identified patent and that said Letters Patent is hereby corrected as shown below:

In the Claims

Column 23, Lines 54-60, Claim 8, reads:
"(a) distillation;
(b) steam distillation;
(c) extraction;
    (d) stripping with an inert gas;
    (e) subjecting the leucoindigo solution to a purification stream; or
    (f) a combination of two or more thereof."
Should be:
--(a) distillation;
(b) steam distillation;
(c) extraction;
(d) stripping with an inert gas;
(e) subjecting the leucoindigo solution to a purification stream; or
(f) a combination of two or more thereof.--.

Column 24, Line 32, Claim 15, reads:
"been discharged from the device according to step (c)."
Should be:
--been discharged from the device according to step ($\varepsilon$).--.

Signed and Sealed this
Fourth Day of October, 2022

Katherine Kelly Vidal
*Director of the United States Patent and Trademark Office*